United States Patent [19]
Ikeda

[11] Patent Number: 6,052,988
[45] Date of Patent: Apr. 25, 2000

[54] APPARATUS FOR CONTROLLING THE SUPPLY OF ELECTRIC POWER TO ELECTRICALLY HEATED CATALYST

[75] Inventor: Shinji Ikeda, Mishima, Japan

[73] Assignee: Toyota Jidosha Kabushiki Kaisha, Aichi, Japan

[21] Appl. No.: 08/712,030

[22] Filed: Sep. 11, 1996

[30] Foreign Application Priority Data

Sep. 13, 1995 [JP] Japan .................................. 7-235070

[51] Int. Cl.[7] ...................................................... F01N 3/20
[52] U.S. Cl. ............................... 60/284; 60/286; 60/300; 219/202; 219/519
[58] Field of Search .............................. 60/276, 277, 284, 60/286, 300; 219/202, 205, 509, 519; 422/174

[56] References Cited

U.S. PATENT DOCUMENTS

| | | | |
|---|---|---|---|
| 4,992,672 | 2/1991 | Norton | 307/10.1 |
| 5,261,230 | 11/1993 | Yuuki et al. | 60/276 |
| 5,321,231 | 6/1994 | Schmalzriedt et al. | 219/497 |
| 5,325,038 | 6/1994 | Banzai et al. | 320/6 |
| 5,740,675 | 4/1998 | Shimasaki et al. | 60/284 X |

FOREIGN PATENT DOCUMENTS 5-214927  8/1993  Japan .

OTHER PUBLICATIONS

Automotive Engineering, vol. 102; No. 4, Apr. 1, 1994, pp. 51–54, XP000442147 "Alternator–Powered, Electrically Heated Catalyst".

Patent Abstracts of Japan, vol. 018, No. 671 (M–1726), Dec. 19, 1994, abstract of JP–6–264727, (Toyota Motor Corp.), Sep. 20, 1994

Primary Examiner—Tony M. Argenbright
Attorney, Agent, or Firm—Kenyon & Kenyon

[57] ABSTRACT

In an initial predetermined period of time for supplying electric power to the electrically heated catalyst mounted on the vehicle, a maximum of electric power is supplied from the power source to simplify the complex heat control operation. Simultaneously with starting of the engine, the electrically heated catalyst is connected to the power source to start supplying the electric power, and a maximum electric power permitted by the power source is supplied for a first predetermined period of time after which the electrically heated catalyst is just about to be activated. After the first predetermined period of time has passed, the electric resistance of the electrically heated catalyst is measured until a second predetermined period of time elapses. Depending upon the thus measured electric resistance, the amount of electric power supplied from the power source to the electrically heated catalyst is controlled by feedback so that the electric resistance of the electrically heated catalyst is maintained at a predetermined target electric resistance. The power source for the electrically heated catalyst may be the alternator driven by the drive source of the vehicle. Furthermore, the power source may be the alternator from starting the engine until the first predetermined period of time elapses, and may, then, be the battery from the elapse of the first predetermined period of time until the second predetermined period of time elapses. Being controlled as described above, the electric power is supplied to the electrically heated catalyst, immediately after starting the engine, easily and reliably.

8 Claims, 9 Drawing Sheets

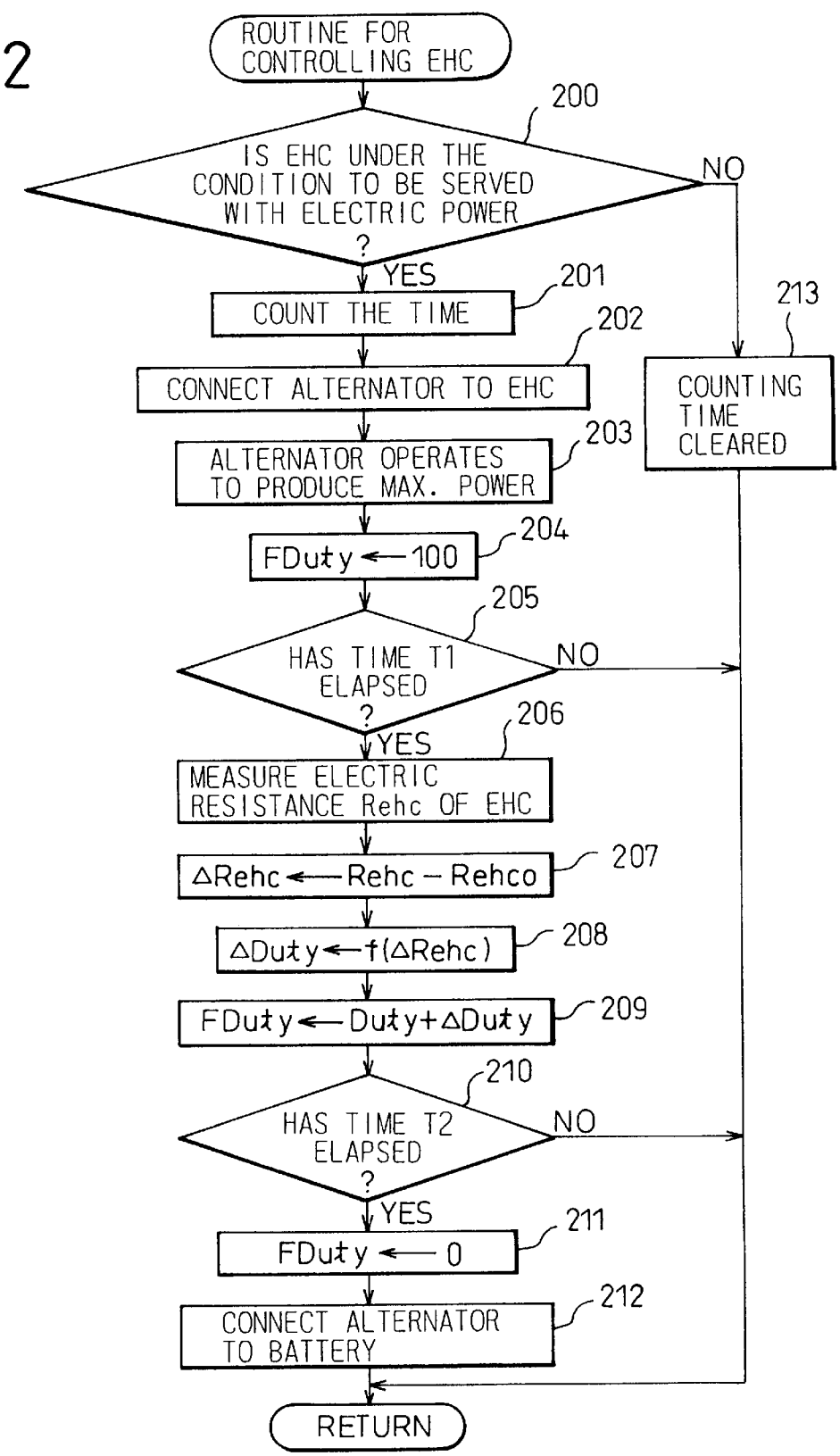

APPARATUS FOR CONTROLLING THE SUPPLY OF ELECTRIC POWER TO ELECTRICALLY HEATED CATALYST

BACKGROUND OF THE INVENTION

1. Field of the Invention

The present invention relates to an apparatus for controlling the supply of electric power to an electrically heated catalyst. More particularly, the invention relates to an apparatus for controlling the supply of electric power to an electrically heated catalyst attached to the exhaust gas passage of an automobile in order to heat the electrically heated catalyst to promote the activation of the catalyst when it is cold at the time of cold starting of an internal combustion engine.

2. Description of the Related Art

Exhaust gases emitted from an internal combustion engine of a vehicle contain such harmful substances as HC (hydrocarbons) and NOx (nitrogen oxides). In an exhaust gas passage of an internal combustion engine is usually provided a catalytic converter which is a device for removing impurities contained in the exhaust gases. However, it has been known that when the temperature of the catalyst is low (in an inactive state), the three-way catalyst used in the catalytic converter works to remove only some of the harmful substances contained in the exhaust gases. Therefore, when the catalytic converter is in the inactive state after cold starting of the internal combustion engine, the exhaust gases cannot be cleaned to a sufficient degree.

There has been proposed a device for cleaning exhaust gases which is installed in the exhaust gas passage on the upstream side of the catalytic converter, the device incorporating an electrically heated second catalytic converter (EHC: electrically heated catalyst) carrying an oxidizing catalyst and having an electric heater, so that when the first catalytic converter is still inactive, the second catalytic converter is electrically heated to activate the oxidizing catalyst and to promote the removal of HC.

Electric power must be supplied to the second catalytic converter (hereinafter referred to as electrically heated catalyst) only until the catalytic converter is activated. The electric power supplied to the electrically heated catalyst can be controlled by detecting the temperature of the electrically heated catalyst. A temperature sensor is usually required to directly detect the temperature of the electrically heated catalyst. However, the electric resistance (which rises with an increase in the temperature) of the electrically heated catalyst which is nearly equal to the catalyst temperature can be detected, without using the temperature sensor, to thereby indirectly detect the catalyst temperature of the electrically heated catalyst.

Japanese Unexamined Patent Publication (Kokai) No. 5-1526 discloses technology according to which the electric resistance of the electrically heated catalyst is detected and the amount of electric power supplied from the battery is controlled by feedback depending upon the electric resistance that is detected. That is, according to technology disclosed in Japanese Unexamined Patent Publication (Kokai) No. 5-1526, the feedback control is effected based upon the electric resistance of the electrically heated catalyst from the moment of starting the supply of electric power to the electrically heated catalyst, and the electric resistance is detected at all times.

However, it is difficult to correctly measure the electric resistance of the electrically heated catalyst in a manner as taught by Japanese Unexamined Patent Publication (Kokai) No. 5-1526. In particular, it is difficult to correctly measure the electric resistance of the electrically heated catalyst at the time of starting the supply of electric power, and the control performance is impaired.

SUMMARY OF THE INVENTION

The object of the present invention is to provide an apparatus for controlling electric power to an electrically heated catalyst, wherein when the electric power is supplied from the power source to the electrically heated catalyst attached to the exhaust gas passage of an internal combustion engine to promote the activation of the catalyst and when it is difficult to correctly measure the electric resistance of the electrically heated catalyst at the time of starting the supply of electric power, the supply of electric power is open-loop-controlled and then when it becomes possible to correctly detect the electric resistance of the electrically heated catalyst, the electric power is controlled by feedback based upon the electric resistance that is detected, in order to reliably heat the electrically heated catalyst to a proper temperature in an initial stage.

For this purpose, according to the present invention, the open-loop-control is executed for a predetermined period of time from the start of supply of electric power to supply a maximum degree of electric power to the electrically heated catalyst when the electric power is to be supplied to the electrically heated catalyst immediately after starting of an internal combustion engine and, thereafter, the electric resistance of the electrically heated catalyst is detected and the electric power is controlled by feedback based upon the electric resistance that is detected in order to reliably heat the electrically heated catalyst to a proper temperature in an initial stage.

According to the present invention which executes the above-mentioned control operation, the apparatus for controlling the supply of electric power from the power source to the electrically heated catalyst to electrically heat the catalyst carrier attached to the exhaust gas passage of an internal combustion engine comprises a start detection means, a time counting means, a resistance detection means, first and second electric power supply control means, and a power supply interrupt means. The start detection means detects starting of an internal combustion engine. The time counter means counts the passage of time from starting of the internal combustion engine. The resistance detection means detects the electric resistance of the electrically heated catalyst. The first power supply control means supplies a maximum permissible electric power from the power source to the electrically heated catalyst simultaneously with starting of the internal combustion engine. The second electric power supply control means interrupts the supply of electric power from the power source to the first electric power supply control means when passage of time from immediately after starting of the internal combustion engine has reached a first predetermined period of time of just before the catalyst is activated and, thereafter, controls by feedback the supply of electric power based on the electric resistance so that the electric resistance is maintained at a predetermined value. The electric power supply interrupt means interrupts the supply of electric power from the power source to the electrically heated catalyst when the time from the starting of the internal combustion engine has reached a second predetermined period of time long enough for activating the catalyst.

The power source according to this constitution is an alternator that generates electricity and is driven by a drive source of the vehicle or a battery mounted on the vehicle. It is further allowable that the first power supply control means supplies electric power to the electrically heated catalyst from the power source which is the alternator, and the second power supply means supplies the electric power to the electrically heated catalyst from the power source which is the battery.

According to the present invention, the electric power is supplied to the electrically heated catalyst simultaneously with starting of the internal combustion engine, and a maximum permissible electric power is supplied from the power source by the first electric power supply control means until the first predetermined period of time has elapsed. After the first predetermined period of time has elapsed, the second electric power supply control means controls by feedback the supply of electric power based upon the electric resistance of the electrically heated catalyst so that the resistance is maintained at a predetermined value. After the second predetermined period of time has elapsed, the electric power supply interrupt means interrupts the supply of electric power to the electrically heated catalyst from the power source.

When the first electric power supply control means supplies the electric power to the electrically heated catalyst from the power source which is the alternator that generates electricity being driven by the drive source of the vehicle, a voltage higher than that of the battery is obtained to increase the supply of electric power making it possible to quickly and reliably raise the temperature of the electrically heated catalyst.

It is further allowable that the first electric power supply control means supplies electric power to the electrically heated catalyst from the power source which is the alternator that generates electricity being driven by the drive source of the vehicle, and the second electric power supply control means supplies the electric power to the electrically heated catalyst from the power source which is the battery mounted on the vehicle.

BRIEF DESCRIPTION OF THE DRAWINGS

The present invention will be more clearly understood from the description as set forth below with reference to the accompanying drawings, wherein:

FIG. 2 is a flow chart illustrating a routine for controlling the electrically heated catalyst in the apparatus for controlling the supply of electric power to the electrically heated catalyst of the embodiment shown in FIG. 1;

DESCRIPTION OF THE PREFERRED EMBODIMENTS

Figure 1:
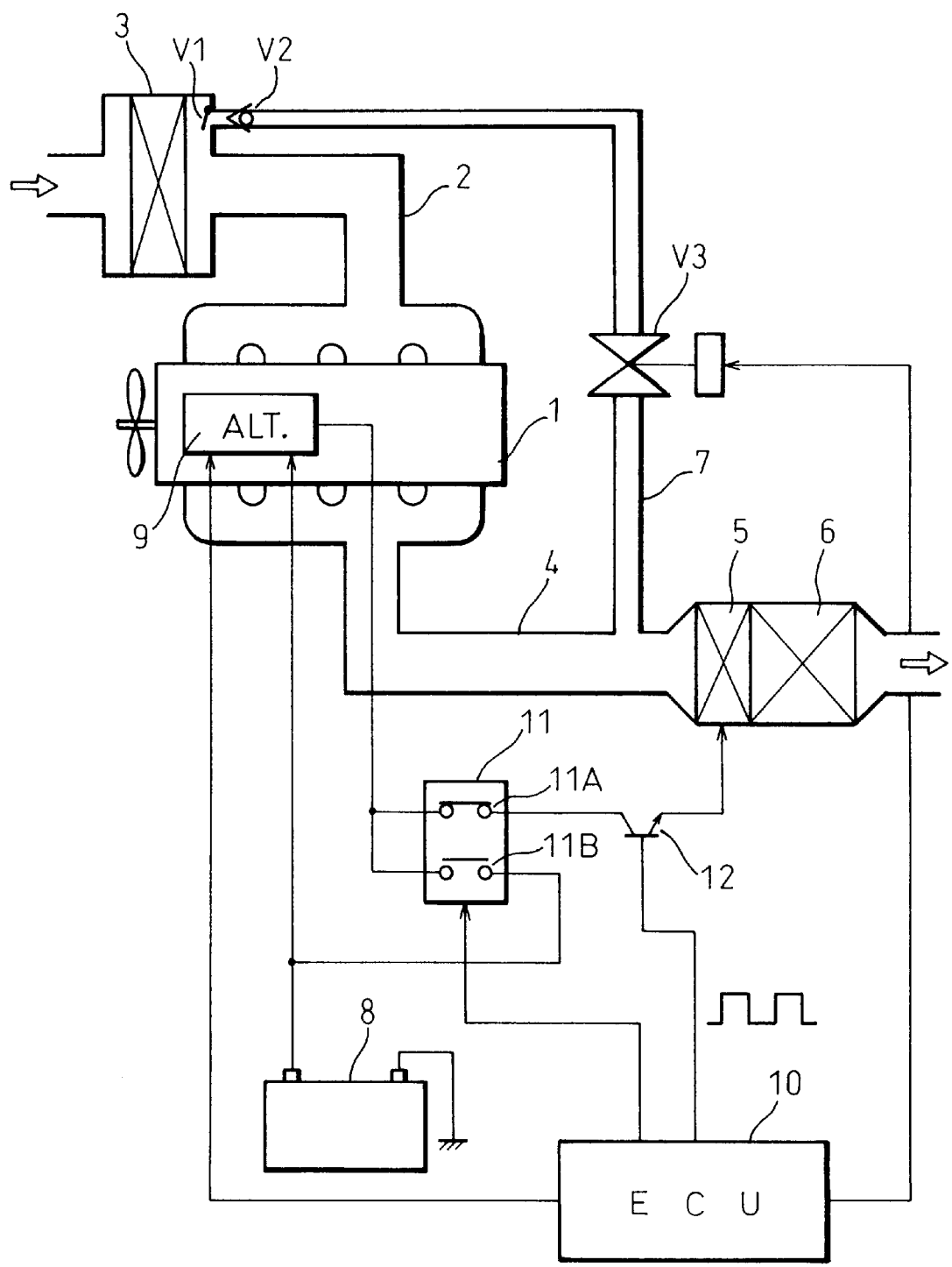
FIG. 1 is a diagram of the whole constitution of an internal combustion engine illustrating an apparatus for controlling the supply of electric power to an electrically heated catalyst according to a first embodiment of the present invention.

FIG. 1 illustrates the whole constitution of an internal combustion engine mounting an apparatus for controlling the supply of electric power to an electrically heated catalyst according to a first embodiment of the present invention. In FIG. 1, reference numeral 1 denotes an internal combustion engine (hereinafter referred to as engine), and an air cleaner is provided in an intake passage 2. An ordinary catalytic converter 6 is provided in the exhaust gas passage 4 of the internal combustion engine 1, and an electrically heated catalyst 5 is provided on the upstream side of the catalytic converter 6 and close thereto.

The exhaust system in which the catalyst is being heated requires oxygen in the exhaust gases in order to accomplish the rise of the temperature based upon the reaction of the catalyst with the fuel, and the secondary air has heretofore been supplied by using an air pump or the like. In this embodiment, a secondary air introduction passage 7 is provided communicating the clean side of the air cleaner 3 with the upstream side of the electrically heated catalyst 5 in order to introduce the secondary air that is necessary at the time of heating the electrically heated catalyst 5. A reed valve V1 and a check valve V2 are provided at a portion where the secondary air introduction passage 7 is connected to the clean side of the air cleaner 3, and the secondary air is introduced into an exhaust passage 4 due to a negative pressure produced by the pulsating exhaust gases.

The secondary air must be cut off when no electric power is supplied to the electrically heated catalyst 5. Therefore, an electromagnetic opening/closing valve V3 is provided on the way of the secondary air introduction passage 7. An ECU (engine control unit) 10 that will be described later causes the electromagnetic opening/closing valve V3 to interrupt the secondary air introduction passage 7 when no electric power is supplied to the electrically heated catalyst 5.

On the engine 1 is provided an alternator 9 which is a generator for generating electricity and is driven by the internal combustion engine 1, and a battery 8 mounted on the vehicle is electrically charged by the alternator 9 that generates electricity. The alternator 9 receives control signals from the ECU 10.

In this embodiment, the output of the alternator 9 is input to either the electrically heated catalyst 5 or the battery 8 via a relay 11. The relay 11 has two contacts 11A and 11B, the contact 11A turning on or off the electric power to the electrically heated catalyst 5 and the contact 11B turning on or off the electric power to the battery 8. The relay 11 is driven by a control signal from the ECU 10, and the contact 11A is turned on when the electric current is to be supplied to the electrically heated catalyst 5 and the contact 11B is turned on when the battery 8 is to be electrically charged.

A switching element 12 is provided in the electric power supply circuit between the contact 11A of the relay 11 and the electrically heated catalyst 5 to control the amount of electric power supplied to the electrically heated catalyst 5. In this embodiment, the switching element 12 is a transistor. The transistor 12 receives, through its base, a control pulse from the ECU 10, and the amount of electric power supplied to the electrically heated catalyst 5 is controlled depending upon the duty ratio of the control pulse.

Described below, with reference to a routine for controlling the electrically heated catalyst (EHC) of FIG. 2, is a control operation for supplying electric power to the electrically heated catalyst 5 at the time of starting the engine in an apparatus for controlling the supply of electric power to the electrically heated catalyst according to the first embodiment constituted as described above. The routine for controlling the EHC may be executed maintaining an interval of about 100 ms.

At a step 200, first, it is determined whether the EHC 5 is in a condition to be supplied with electric power. When the EHC 5 is not in a condition to be supplied with electric power, the count time is cleared at a step 213, and the routine ends. When the EHC 5 is in a condition to be supplied with electric power, the time is counted at a step 201, and the program proceeds to a step 202. The conditions where the EHC 5 is to be supplied with electric power may be, for example, that the water temperature of the engine is not higher than 20° C., the vehicle speed is not higher than 3 km/h, etc.

At a step 202, the contact 11A of the relay 11 is turned on, and the alternator 9 is connected to the EHC 5. At a next step 203, the alternator is operated to produce a maximum output. At a step 204, a final duty ratio FDuty for driving the transistor 12 is set to 100%, whereby the transistor 12 is driven with a 100% duty, and the output of the alternator 9 is supplied to the EHC 5.

At a step 205, it is determined whether a predetermined period of time T1 has elapsed after the alternator 9 was connected to the EHC 5 or not. When the predetermined period of time T1 has not elapsed, the routine ends. When the predetermined period of time T1 has elapsed, the program proceeds to a step 206 and to subsequent steps. That is, a maximum output of the alternator 9 is supplied to the EHC 5 until the predetermined period of time T1 elapses.

When the predetermined period of time T1 has passed after the alternator 9 has been connected to the EHC 5, the electric resistance Rehc of the EHC 5 is measured, first, at the step 206. The electric resistance Rehc of the EHC 5 increases with an increase in the temperature of the EHC 5. Therefore, the temperature of the EHC 5 can be estimated by measuring the electric resistance Rehc. At a step 207, a deviation ΔRehc is found between the electric resistance Rehc of the EHC 5 and the target electric resistance Rehco of the EHC. At a next step 208, a correction duty value ΔDuty for the duty ratio for controlling the amount of electric power supplied to the EHC 5 is found by f(ΔRehc) from the deviation ΔRehc between the electric resistance Rehc and the target electric resistance Rehco of the EHC 5. FIG. 3B illustrates characteristics of when ΔDuty=f(ΔRehc).

When the correction duty value ΔDuty is found as described above, the final duty ratio FDuty is obtained at a step 209 by adding the correction duty value ΔDuty to the present duty ratio. Immediately after the predetermined period of time T1 has passed, the electric resistance Rehc of the EHC 5 has not reached the target electric resistance Rehco. Therefore, the correction duty value ΔDuty assumes a negative sign, and the drive duty ratio of the transistor 12 gradually decreases from the 100% duty.

After the final duty ratio FDuty is in effect, it is discriminated at a step 210 whether a predetermined period of time T2 has elapsed or not. When the predetermined period of time T2 has not been elapsed, the routine ends. After the predetermined period of time T1 has passed, therefore, the final duty ratio FDuty is in effect depending upon the electric resistance Rehc of the EHC 5. Thereafter, the EHC 5 is controlled by feedback with a duty ratio corresponding to the electric resistance Rehc of the EHC 5 until the predetermined period of time T2 elapses.

After it is discriminated at the step 210 that the predetermined period of time T2 has passed, the final duty ratio FDuty is set to 0 at a step 211 and no electric power is supplied to the EHC 5. At a next step 212, the contact 11A of the relay 11 is turned off and the contact 11B is turned on, so that the alternator 9 is connected to the battery 8.

Figure 3A:
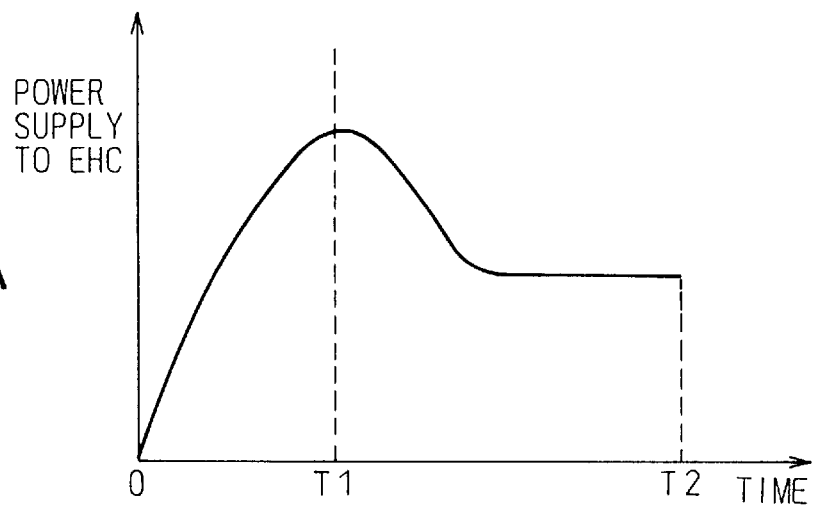
FIG. 3A is a diagram of characteristics illustrating a change in the supply of electric power from the alternator to the electrically heated catalyst relative to the time according to the present invention.
Figure 3B:
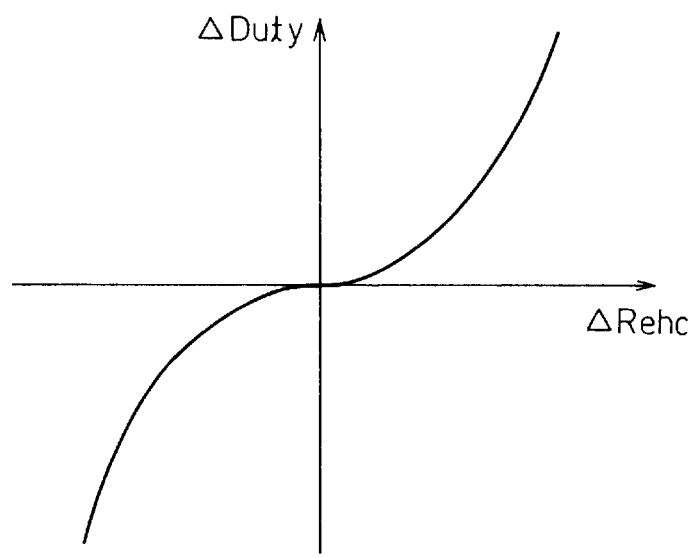
FIG. 3B is a diagram of characteristics for operating a correction duty value of a control pulse depending upon a deviation in the electric resistance of the electrically heated catalyst.

FIG. 3A illustrates the electric power supplied to the EHC 5 with the passage of time in compliance with the routine for controlling the EHC of FIG. 2 immediately after starting of the engine. Right after starting of the engine, as will be obvious from FIG. 3A, a maximum amount of electric power is supplied from the alternator 9 to the EHC 5 as the running speed of the engine increases. After the passage of the predetermined period of time T1, the amount of electric power supplied from the alternator 9 to the EHC 5 decreases with a decrease in the duty ratio and after the electric resistance Rehc of the EHC 5 has reached the target electric resistance Rehco, a constant amount of electric power is supplied and controlled by feedback. After the predetermined period of time T2 has passed, no electric power is supplied to the EHC 5. The predetermined periods of time T1 and T2 will be about 5 seconds and 20 seconds, respectively, after starting the supply of electric power to the EHC 5.

According to the apparatus for controlling the supply of electric power to the electrically heated catalyst of the embodiment described above, no feedback control is effected, relying upon the electric resistance of the EHC 5, at the time of starting the engine. Therefore, operation for controlling the supply of electric power to the EHC 5 does not become complex immediately after starting of the engine. After the catalyst is activated, furthermore, the feedback control is effected based upon the electric resistance that represents the temperature of the EHC 5, making it possible to avoid an excess supply of electric power to the EHC 5. The electric power is supplied to the EHC 5 from a power source which is the alternator 9 that generates electricity while being driven by the drive source of the vehicle. Therefore, a higher application voltage is obtained than that of when the battery 8 is used as the power source, and the temperature of the EHC 5 can be raised more quickly and reliably.

Figure 4:
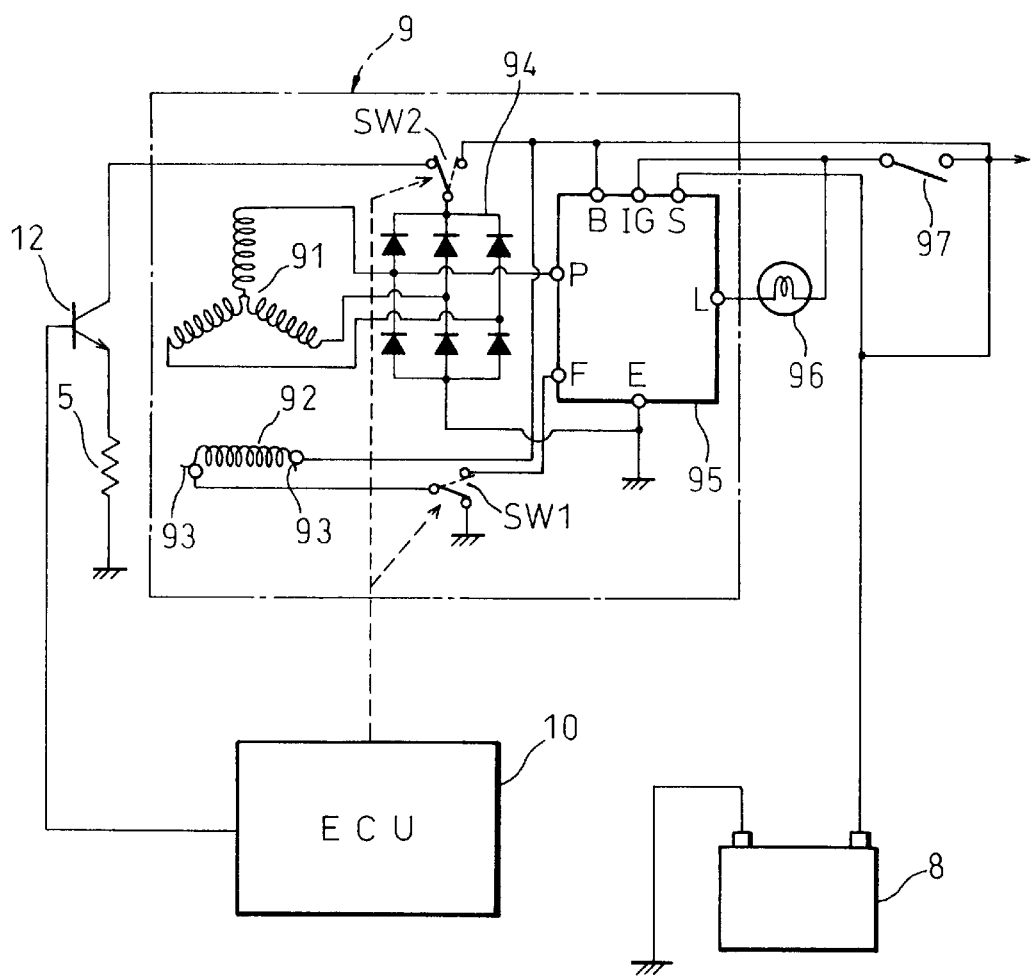
FIG. 4 is a circuit diagram illustrating a concrete circuit constitution around the alternator used in the present invention.

FIG. 4 illustrates a concrete circuit constitution of the alternator 9 which incorporates the relay 11 used in the first embodiment, explained with reference to FIG. 1, and peripheral circuits. In FIG. 4, the relay 11 having two contacts, explained with reference to FIG. 1, is represented as change-over switches SW1 and SW2.

In FIG. 4, reference numeral 9 denotes an alternator which contains a three-phase star-connected stator coil 91, a rotor coil 92, brushes 93, a three-phase full-wave rectifier 94 made up of a diode bridge, an IC regulator 95, and change-over switches SW1 and SW2. The change-over switches SW1 and SW2 are changed over by the ECU 10. The change-over switch SW1 connects an end of the rotor coil 92 to ground or to the IC regulator 95. Further, the change-over switch SW2 connects the three-phase full-wave rectifier 94 to either the IC regulator 95 or to the EHC 5 through the transistor 12. The IC regulator 95 has a charging terminal B, an ignition terminal IG connected to an ignition switch 97, a lamp terminal L connected to a charge lamp 96, a field current terminal F connected to the rotor coil 92, a phase terminal P connected to one of the phases of the stator coil 91, and an earth terminal E that is grounded. The other end of the charge lamp 96 is connected to the ignition switch 97, and the other end of the ignition switch 97 is connected to a battery 8 and to an electric circuit, that is not shown, of an automobile.

In the embodiment constituted as described above, the change-over switches SW1 and SW2 are connected to the sides of dotted lines in an ordinary state where the ignition switch 97 is turned on, and the electric power generated in the stator coil 91 is rectified through the three-phase full-wave rectifier 14 and is input to the battery 8 via the IC regulator 95. The charge lamp 96 turns on. This state corresponds to the state where the contact 11B of the relay 11 is turned on in FIG. 1.

Immediately after the start of the engine by turning the ignition switch 97 on, the change-over switches SW1 and SW2 are connected as shown by solid lines due to the ECU 10 under the condition where the EHC 5 is to be served with the electric power, and the electric power generated by the stator coil 91 is rectified through the three-phase full-wave rectifier 94 and is all input to the EHC 5 through the transistor 12. In this case, the charge lamp 96 is not turned on. This state corresponds to the state where the contact 11A of the relay 11 is turned on in FIG. 1.

Even in the embodiment of FIG. 4, immediately after starting the engine, the change-over switches SW1 and SW2 are changed over as shown by solid lines until a predetermined period of time T1 elapses, and the transistor 12 is driven at a 100% duty. Then, during the period after the elapse of the predetermined period of time T1 and until the predetermined period of time T2 elapses, the transistor 12 is driven at a duty ratio corresponding to the electric resistance Rehc of the EHC 5. After the predetermined period of time T2 has elapsed, the change-over switches SW1 and SW2 are changed over as shown by dotted lines.

According to the embodiment of FIG. 4 as described above, no feedback control is effected relying upon the electric resistance of the EHC 5 at the time of starting the engine. Therefore, an operation for controlling the supply of electric power to the EHC does not become complex immediately after starting of the engine. After the catalyst is activated, furthermore, the feedback control is effected based upon the electric resistance that represents the temperature of the EHC, making it possible to avoid an excess supply of electric power to the EHC.

In the first embodiment described above, the alternator 9 is connected to the EHC 5 when the EHC 5 is in a condition to be supplied with electric power immediately after starting of the engine and, then, the duty ratio for the transistor 12 is controlled to control the amount of electric power supplied to the EHC 5 as shown in FIG. 3A. On the other hand, after the alternator 9 is connected to the EHC 5 in a condition where the EHC 5 is to be supplied with electric power after the engine has been started, the electric power can be supplied to the EHC 5, in a manner represented by the characteristics of FIG. 3A, by controlling a field current that flows into the rotor coil 92 of the alternator 9 shown in FIG. 4. A modified embodiment of the first embodiment which is capable of executing the above method will now be described with reference to FIG. 5.

Figure 5:
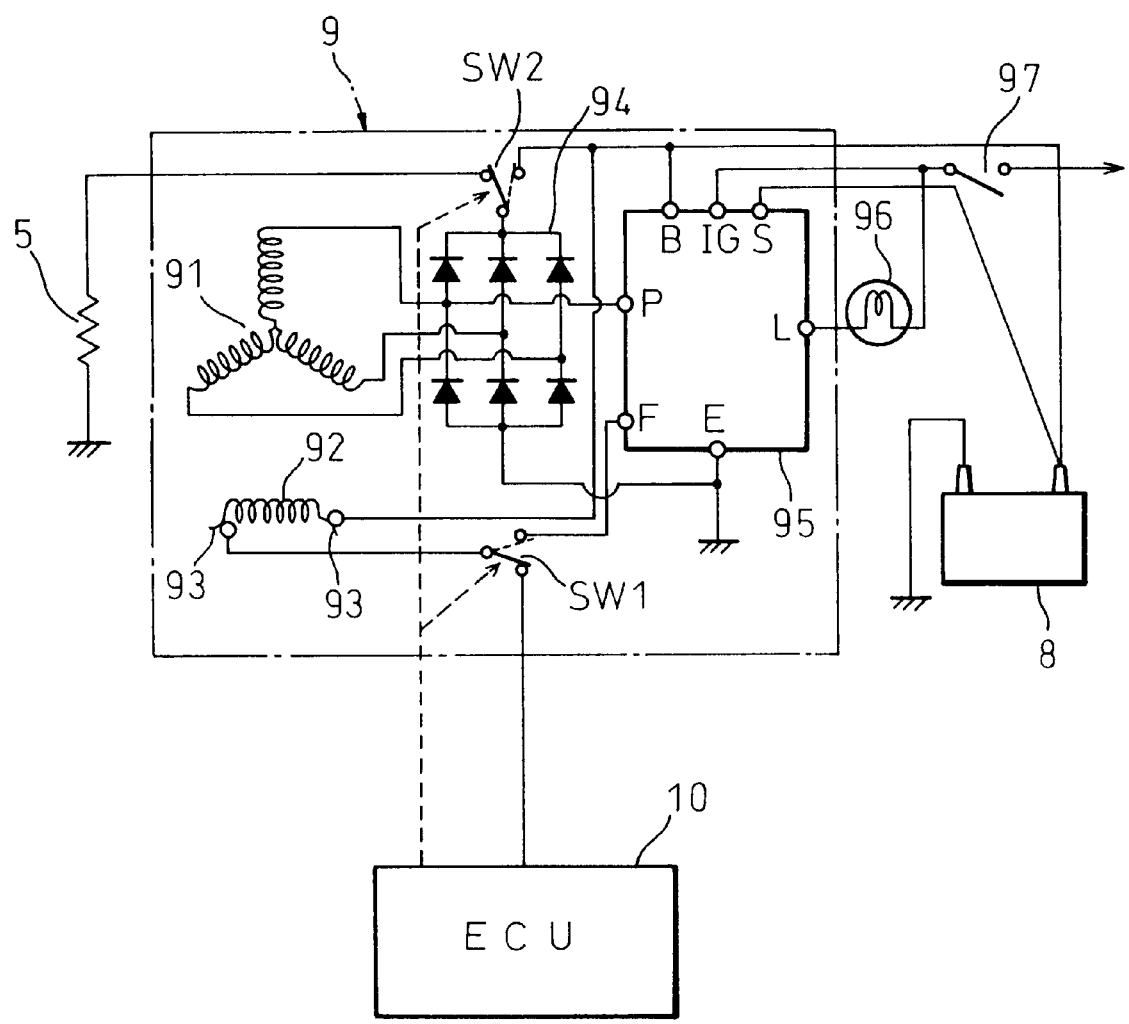
FIG. 5 is a circuit diagram illustrating another concrete circuit constitution around the alternator used in the present invention.

Even in the embodiment of FIG. 5, the relay explained with reference to FIG. 1 is incorporated as change-over switches SW1, SW2 in the body of the alternator 9. In the embodiment of FIG. 5, furthermore, reference numeral 9 denotes the alternator, 91 denotes the three-phase star-connected stator coil, 92 denotes the rotor coil, 93 denotes the brush, 94 denotes the three-phase full-wave rectifier, 95 denotes the IC regulator, 96 denotes the charge lamp, 97 denotes the ignition switch, and SW1 and SW2 denote change-over switches. Their connection is the same as that of the embodiment explained with reference to FIG. 4 except for the following points.

The embodiment of FIG. 5 is different from the embodiment of FIG. 4 in that one contact of the change-over switch SW1 is connected to the ECU 10 and the field current of the rotor coil 92 is controlled by the ECU 10, and in that no transistor is provided in a circuit connecting one contact of the change-over switch SW2 to the EHC 5.

In the embodiment constituted as shown in FIG. 5, the change-over switches SW1 and SW2 are connected as shown by the dotted lines in an ordinary state where the ignition switch 97 is turned on, and the electric power generated in the stator coil 91 is rectified through the three-phase full-wave rectifier 14 and is input to the battery 8 through the IC regulator 95. At this moment, the charge lamp 96 turns on. This state corresponds to the state where the contact 11B of the relay 11 is turned on in FIG. 1.

Immediately after the start of the engine by turning the ignition switch 97 on, the change-over switches SW1 and SW2 are connected as shown by solid lines because the ECU 10 is in a condition where the EHC 5 is to be supplied with electric power. In this condition, the ECU 10 is capable of controlling the field current of the rotor coil 91. Therefore, the field current is so controlled that a maximum current flows into the rotor coil 91 from starting of the engine until the predetermined period of time T1 passes, and the electric power generated in the stator coil 91 is rectified through the three-phase full-wave rectifier 94 and is all input to the EHC 5. During the period of from the predetermined period of time T1 to the predetermined period of time T2, on the other hand, the field current of the rotor coil 91 is controlled depending upon the electric resistance Rehc of the EHC 5 detected by the ECU 10, and the electric power supplied to the EHC 5 is controlled by feedback. Upon controlling the field current of the rotor coil 91 as described above, the ECU 10 supplies the electric power to the EHC 5 in a manner represented by the characteristics of FIG. 3(a).

In the above-mentioned embodiment, the electric power is all supplied from the alternator 9 to the EHC 5 from the starting of the engine until the predetermined period of time T2 elapses. During the period of from the predetermined period of time T1 until the predetermined period of time T2, however, the electric power may be supplied to the EHC 5 from the battery 8.

Figure 6:
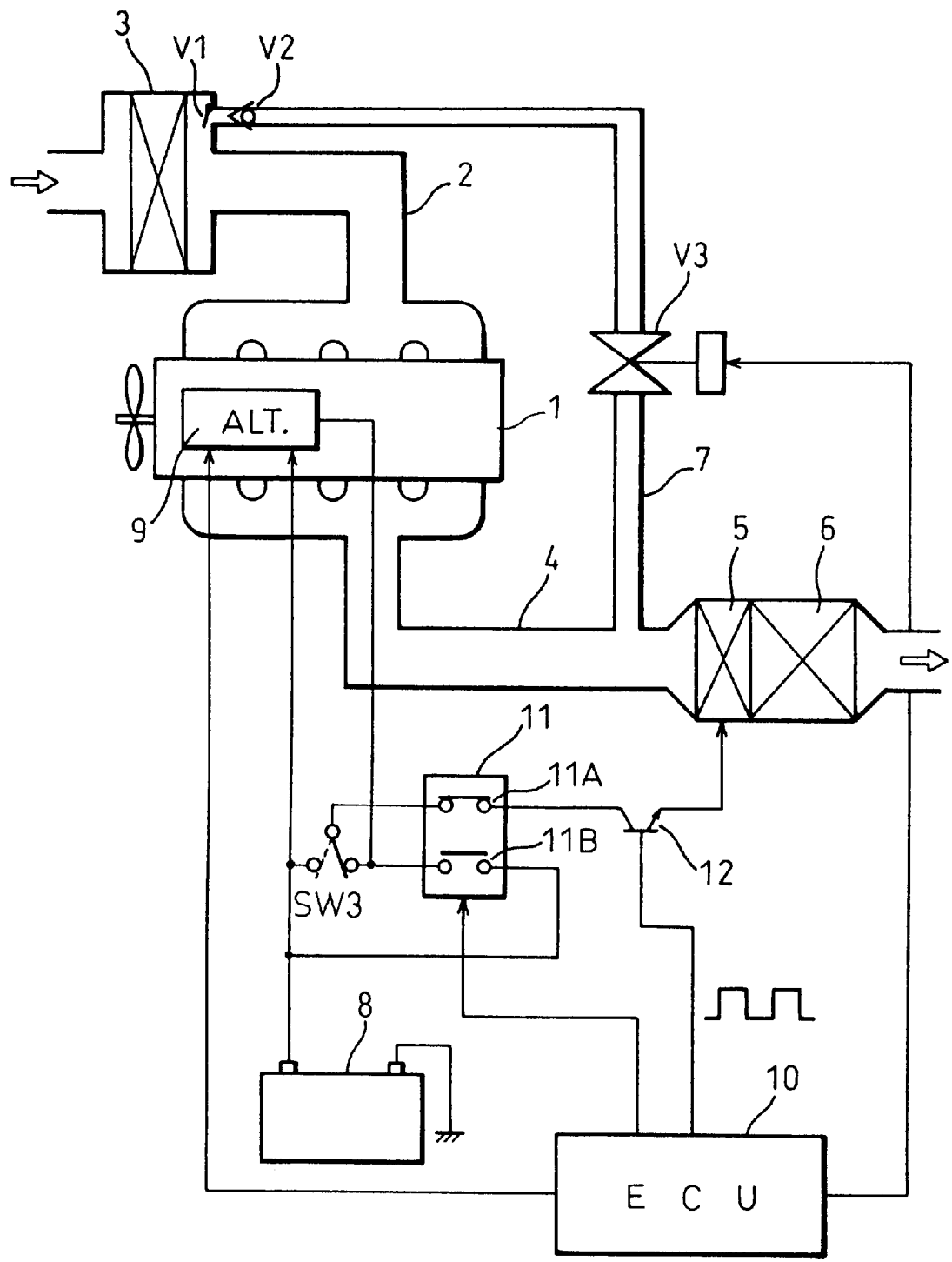
FIG. 6 is a diagram of the whole constitution of an internal combustion engine illustrating an apparatus for controlling the supply of electric power to an electrically heated catalyst according to a second embodiment of the present invention.

FIG. 6 illustrates the constitution of the apparatus for controlling the supply of electric power to the electrically heated catalyst according to the second embodiment. The constitution of FIG. 6 is nearly the same as that of FIG. 1, and the same constituent members are denoted by the same reference numerals but their description is omitted. The constitution of the apparatus for controlling the supply of electric power of FIG. 6 different from the apparatus for controlling the supply of electric power of FIG. 1 in that only a change-over switch SW3 is provided on the power source side of the contact 11A of the relay 11. The change-over switch SW3 is changed over to the side shown by a solid line by the ECU 10 until the time T1 elapses from starting of the engine, and is changed over to the side shown by a dotted line after the time T1 has passed.

Figure 7:
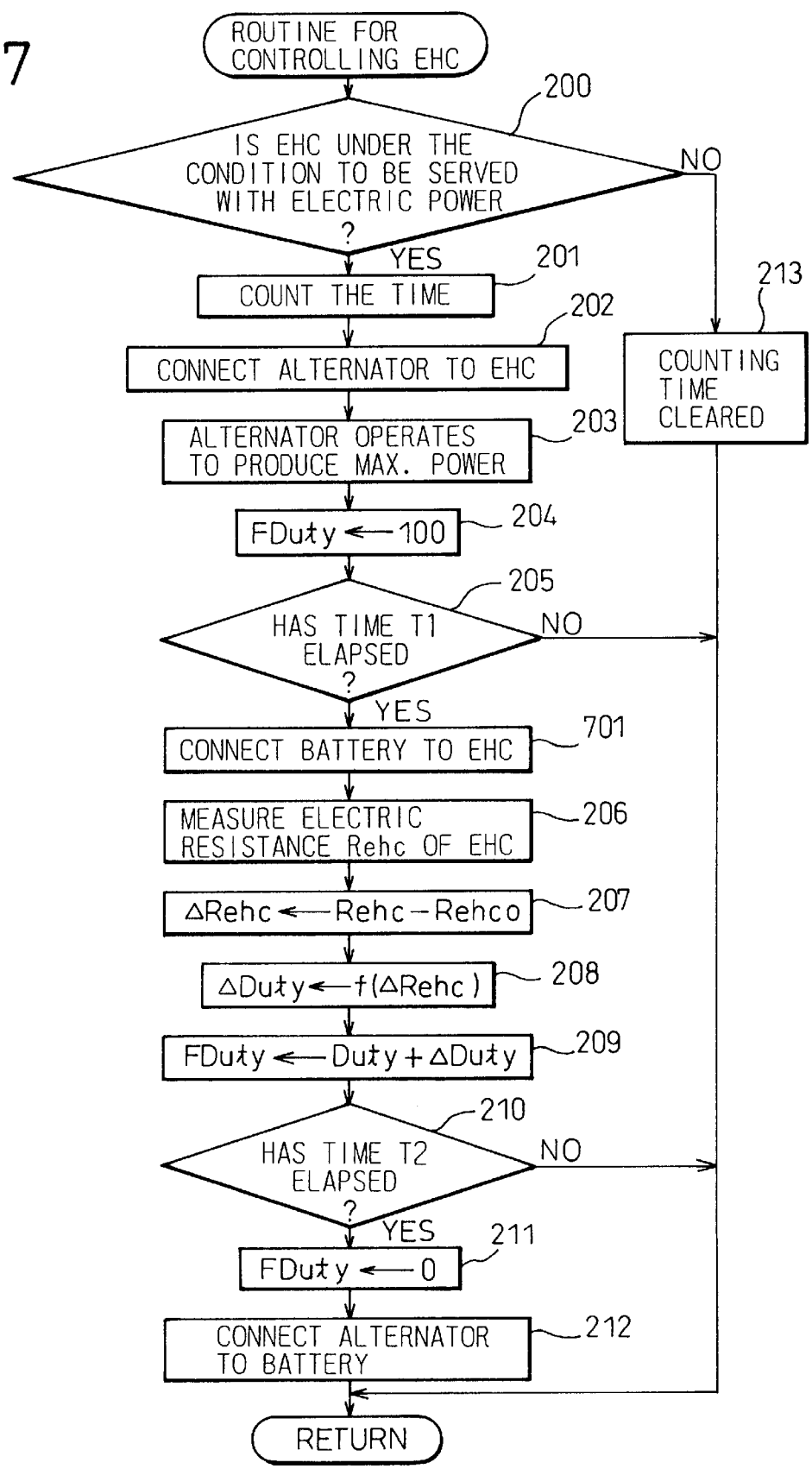
FIG. 7 is a flow chart illustrating a routine for controlling the electrically heated catalyst in the apparatus for controlling the supply of electric power to the electrically heated catalyst of the embodiment shown in FIG. 6.

FIG. 7 illustrates controlling the supply of electric power to the electrically heated catalyst 5 at the time of starting the engine when the apparatus for controlling the supply of electric power to the electrically heated catalyst is constituted as shown in FIG. 6. The control routine shown in FIG. 7 is almost the same as the routine for controlling the EHC explained with reference to FIG. 2, and what makes a difference is that a step 701 is newly provided between the step 205 and the step 206. Therefore, the same steps are denoted by the same reference numerals but their description is omitted.

At the step 701 newly provided in the control routine of FIG. 7, the change-over switch SW3 explained with reference to FIG. 6 is changed over to the position shown by a dotted line from the position shown by a solid line, the alternator 9 connected to the EHC 5 at the step 202 is disconnected from the EHC 5 and, instead, the battery 8 is connected to the EHC 5. As a result, after the passage of the time T1 under the condition where the EHC 5 is to be supplied with electric power, the EHC 5 is supplied with electric power from the battery 8.

Figure 8:
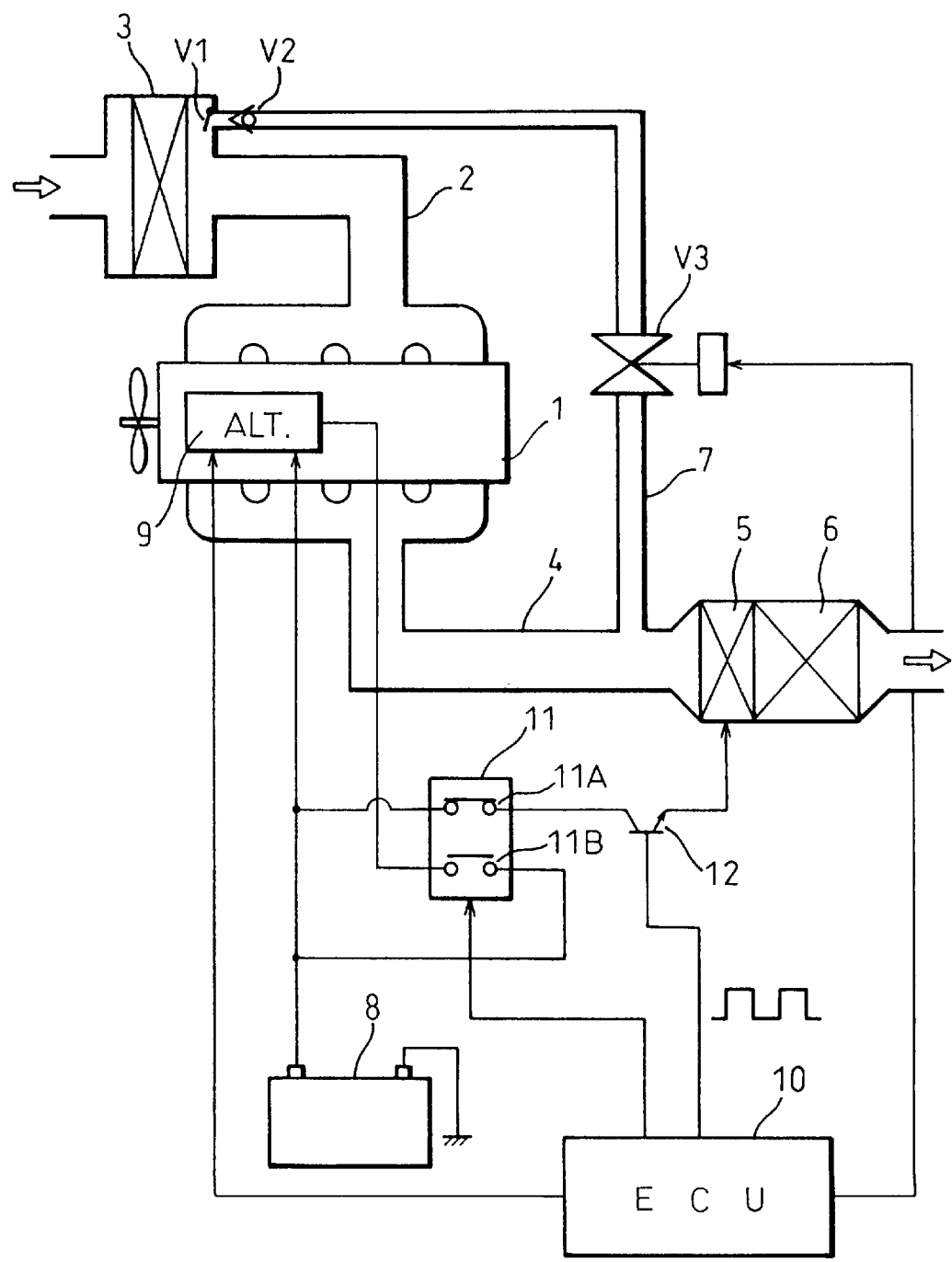
FIG. 8 is a diagram of the whole constitution of an internal combustion engine illustrating an apparatus for controlling the supply of electric power to an electrically heated catalyst according to a third embodiment of the present invention.

According to a third embodiment shown in FIG. 8, furthermore, the EHC 5 may be connected to the battery 8 only through the contact 11A of the relay 11, and the alternator 9 may be connected to the battery 8 through the contact 11B of the relay 11. In this case, when the electric power is supplied to the EHC 5 by closing the contact 11A of the relay 11, the battery 8 should be electrically charged by closing the contact 11B of the relay 11 so that the voltage of the battery 8 will not drop.

Figure 9:
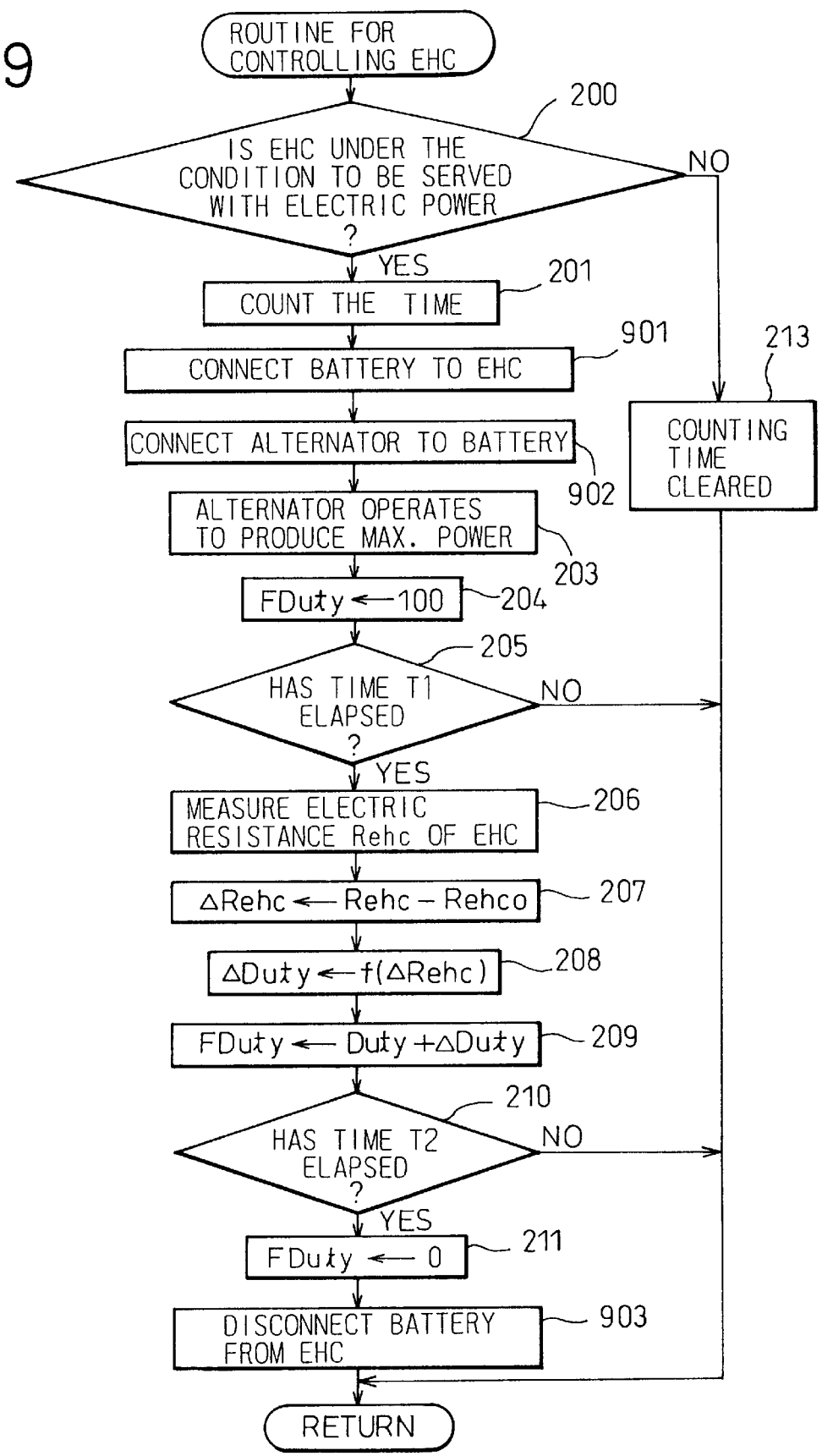
FIG. 9 is a flow chart illustrating a routine for controlling the electrically heated catalyst in the apparatus for controlling the supply of electric power to the electrically heated catalyst of the embodiment shown in FIG. 8.

FIG. 9 illustrates a control operation for supplying electric power to the electrically heated catalyst 5 at the time of starting the engine when the apparatus for controlling the supply of electric power to the electrically heated catalyst is constituted as shown in FIG. 8. The control routine shown in FIG. 9 is almost the same as the routine for controlling the EHC explained with reference to FIG. 2, except that the step 202 is replaced by a step 901, a step 902 is inserted before the step 203, and the step 212 is replaced by a step 903. Therefore, the same steps are denoted by the same step numerals but their description is omitted.

At the step 901 newly provided in the control routine of FIG. 9, the contact 11A of the relay 11 is turned on to connect the battery 8 to the EHC 5. At the step 902, the contact 11B of the relay 11 is turned on to connect the alternator 9 to the battery 8 and at the step 903, the contact 11A of the relay 11 is turned off to disconnect the battery 8 from the EHC 5. As a result, under the condition where the EHC 5 is to be supplied with electric power, the electric power is supplied to the EHC 5 from the battery 8 only. Here, however, the voltage of the battery 8 does not drop since the battery 8 has been electrically charged by the alternator 9.

According to the present invention as explained above by way of embodiments, no feedback control is effected relying upon the electric resistance of the EHC 5 at the time of starting the engine. Therefore, the operation for controlling the supply of electric power to the EHC does not become complex immediately after starting of the engine. After the catalyst is activated, furthermore, the feedback control is effected based upon the electric resistance that represents the temperature of the EHC, making it possible to avoid an excess supply of electric power to the EHC.

What is claimed is:

1. An apparatus for controlling the supply of electric power from a power source to an electrically heated catalyst to electrically heat the catalyst carrier attached to the exhaust gas passage of an internal combustion engine, comprising:

a power source circuit-switching means disposed between said power source and said electrically heated catalyst;

a start detection means for detecting the start of said engine;

a time counting means for counting the passage of time from the starting of said engine;

a resistance detection means for detecting the electric resistance of said electrically heated catalyst;

first electric power supply control means for turning said switching means on simultaneously with starting of said engine and for feeding a maximum permissible electric power from said power source to said electrically heated catalyst;

second electric power supply control means for interrupting the supply of electric power from said power source by said first electric power supply control means when the lapse of time from starting of said engine has reached a first predetermined period of time just before said catalyst is activated and, then, controlling the supply of electric power by feedback through said switching means based upon said electric resistance so that the resistance is maintained at a predetermined resistance; and a power supply interrupt means for interrupting the supply of electric power from said power source to said electrically heated catalyst when the lapse of time from starting of said engine has reached a second predetermined period of time which is long enough for activating said catalyst.

2. An apparatus for controlling the supply of electric power to an electrically heated catalyst according to claim 1, wherein said switching means comprises a relay and a switching transistor, and said switching transistor is driven at the duty ratio of a control pulse.

3. An apparatus for controlling the supply of electric power to an electrically heated catalyst according to claim 1, wherein said power source is an alternator that generates electricity while being driven by a drive source of the vehicle.

4. An apparatus for controlling the supply of electric power to an electrically heated catalyst according to claim 3, wherein said switching means comprises a relay and a switching transistor, and said switching transistor is driven at the duty ratio of a control pulse.

5. An apparatus for controlling the supply of electric power to an electrically heated catalyst according to claim 1, wherein said power source is a battery mounted on the vehicle.

6. An apparatus for controlling the supply of electric power to an electrically heated catalyst according to claim 5, wherein said switching means comprises a relay and a switching transistor, and said switching transistor is driven at the duty ratio of a control pulse.

7. An apparatus for controlling the supply of electric power to an electrically heated catalyst according to claim 1, wherein said power source comprises a battery mounted on the vehicle and an alternator that generates electricity while being driven by the drive source of the vehicle, and wherein said first electric power supply control means supplies electric power to said electrically heated catalyst from the power source which is the alternator that generates electricity while being driven by the drive source of the vehicle, and said second electric power supply means supplies electric power to said electrically heated catalyst from the power source which is the battery mounted on the vehicle.

8. An apparatus for controlling the supply of electric power to an electrically heated catalyst according to claim 7, wherein said switching means comprises a relay and a switching transistor, and said switching transistor is driven at the duty ratio of a control pulse.

* * * * *